US008751916B2

(12) United States Patent
Bender et al.

(10) Patent No.: US 8,751,916 B2
(45) Date of Patent: Jun. 10, 2014

(54) APPARATUSES, METHODS AND SYSTEMS FOR A COMPOSITE MULTIMEDIA CONTENT GENERATOR

(76) Inventors: Gary T. Bender, San Rafael, CA (US); Stephen A. Cox, Campbell, CA (US)

(*) Notice: Subject to any disclaimer, the term of this patent is extended or adjusted under 35 U.S.C. 154(b) by 1255 days.

(21) Appl. No.: 11/997,296

(22) PCT Filed: Jul. 28, 2006

(86) PCT No.: PCT/US2006/029678
§ 371 (c)(1), (2), (4) Date: Jun. 4, 2009

(87) PCT Pub. No.: WO2007/016457
PCT Pub. Date: Feb. 8, 2007

(65) Prior Publication Data
US 2009/0241015 A1 Sep. 24, 2009

Related U.S. Application Data

(60) Provisional application No. 60/595,724, filed on Jul. 29, 2005.

(51) Int. Cl.
*G06F 17/00* (2006.01)

(52) U.S. Cl.
USPC ........... 715/202; 715/243; 715/253; 715/255; 705/14.34; 705/14.4; 705/14.22

(58) Field of Classification Search
USPC .............. 715/202, 253, 255, 243; 705/14.34, 705/14.4, 14.22
See application file for complete search history.

(56) References Cited

U.S. PATENT DOCUMENTS

| | | | |
|---|---|---|---|
| 6,711,554 B1 * | 3/2004 | Salzmann et al. | 705/64 |
| 6,735,569 B1 * | 5/2004 | Wizig | 705/4 |
| 7,639,386 B1 * | 12/2009 | Siegel et al. | 358/1.18 |
| 8,479,091 B2 * | 7/2013 | Buck et al. | 715/243 |
| 2003/0149618 A1 * | 8/2003 | Sender et al. | 705/14 |
| 2004/0054627 A1 * | 3/2004 | Rutledge | 705/50 |
| 2004/0189667 A1 | 9/2004 | Beda et al. | |
| 2004/0205645 A1 * | 10/2004 | Hoffman | 715/530 |
| 2004/0259553 A1 | 12/2004 | Delaney et al. | |
| 2004/0267552 A1 | 12/2004 | Gilliam et al. | |
| 2005/0038668 A1 * | 2/2005 | Singh et al. | 705/1 |
| 2005/0058318 A1 | 3/2005 | Rhoads | |
| 2005/0216512 A1 | 9/2005 | Dor | |

(Continued)

OTHER PUBLICATIONS

PCT International Search Report and Written Opinion dated Jan. 22, 2007.

*Primary Examiner* — Stephen Hong
*Assistant Examiner* — Matthew Ludwig

(57) ABSTRACT

The disclosure details the implementation of apparatuses, methods, and systems for a Composite Content Generator. The disclosure teaches a Composite Content Generator, which provides a straightforward, unified, and transparent interface that presents users with the ability to customize publication purchases. Buyers of content may desire to customize their purchases in order to acquire certain sections of a work (e.g., select chapters from a travel book, select recipes from a cook book, choose certain subjects out of reference or medical journals, and specific sections of a periodical). In one embodiment, the Composite Content Generator allows buyers to view, select, and purchase portions of various works (e.g., such as books, periodicals, reference materials, and/or the like) and receive fulfillment of their purchase as a customized and modular composite publication.

20 Claims, 8 Drawing Sheets

(56) References Cited

U.S. PATENT DOCUMENTS

| | | | |
|---|---|---|---|
| 2006/0048053 A1* | 3/2006 | Sembower et al. | 715/517 |
| 2007/0011607 A1* | 1/2007 | Lazareck et al. | 715/530 |
| 2007/0260671 A1* | 11/2007 | Harinstein et al. | 709/203 |

* cited by examiner

APPARATUSES, METHODS AND SYSTEMS FOR A COMPOSITE MULTIMEDIA CONTENT GENERATOR

RELATED APPLICATIONS

Claim for Priority

This application is a National Stage Entry entitled to and hereby claims priority under 35 U.S.C. §§365 and 371 corresponding to PCT Application No. PCT/US2006/029678, titled, "APPARATUSES, METHODS AND SYSTEMS FOR A COMPOSITE MULTIMEDIA CONTENT GENERATOR," filed Jul. 28, 2006, which in turn claimed priority to U.S. Provisional Application Ser. No. 60/595,724 filed Jul. 29, 2005; all of which is hereby incorporated by reference.

The entire contents of the aforementioned application is herein expressly incorporated by reference.

FIELD

The present invention is directed generally to apparatuses, methods, and systems of publishing, and more particularly, to apparatuses, methods and systems for aggregating and generating composite content in multiple mediums.

BACKGROUND

Traditionally, people read in paper format. This includes books, newspapers, magazines and other formats. Recently, internet media and on-screen viewing has become popular as well. Currently, those that wish to buy publications, books and periodicals go to traditional outlets such as book stores and newsstands to make purchases of such items. Some purchase books from the World Wide Web from retailers like Amazon.com. These outlets allow customers to browse for such content and make purchases of the content.

SUMMARY

The disclosure details the implementation of apparatuses, methods, and systems for a Composite Content Generator. In many circumstances buyers of content may want to customize their purchases in order to acquire certain sections of a work (e.g., select chapters from a travel book, select recipes from a cook book, choose certain subjects out of reference or medical journals, and/or specific sections of a periodical). Traditional outlets do not allow for the purchasing of partial works. This disclosure details various mechanisms for offering buyers of these books, publications and periodicals the ability to select the specific portions they wish to purchase, and order only those portions. In addition, the disclosure details how the Composite Content Generator allows for fulfillment and delivery of the customized, modular composite order. In one embodiment, the Composite Content Generator allows one to order a compilation of specific portions of various works and combine those portions into one composite publication, book or periodical.

BRIEF DESCRIPTION OF THE DRAWINGS

The accompanying appendices and/or drawings illustrate various non-limiting, example, inventive aspects and embodiments in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Composite Content Multimedia Generator Overview

In one embodiment, the Composite Content Generator allows one to compile specific orders from various works and combine the order into one publication, book or periodical. For example, a buyer seeking advice for travel tips for various cities throughout Europe can select the dinning and lodging sections for Paris from Rick Steve's, the sightseeing section of Avignon from Let's Go Europe, the dining section of Nice from Frommers and the Museum section of Florence from Fodors. Another example would be the compilation of research or subject matter expertise for personal or professional research. For example, a professor may place an order for a varied composite of chosen chapters from various textbooks that best describe a subject along with some periodicals to compliment the subject. In one embodiment, this order would then be fulfilled and delivered to the customer in one finished book, publication or periodical.

Composite Content Multimedia Generator

Generation

Figure 1:
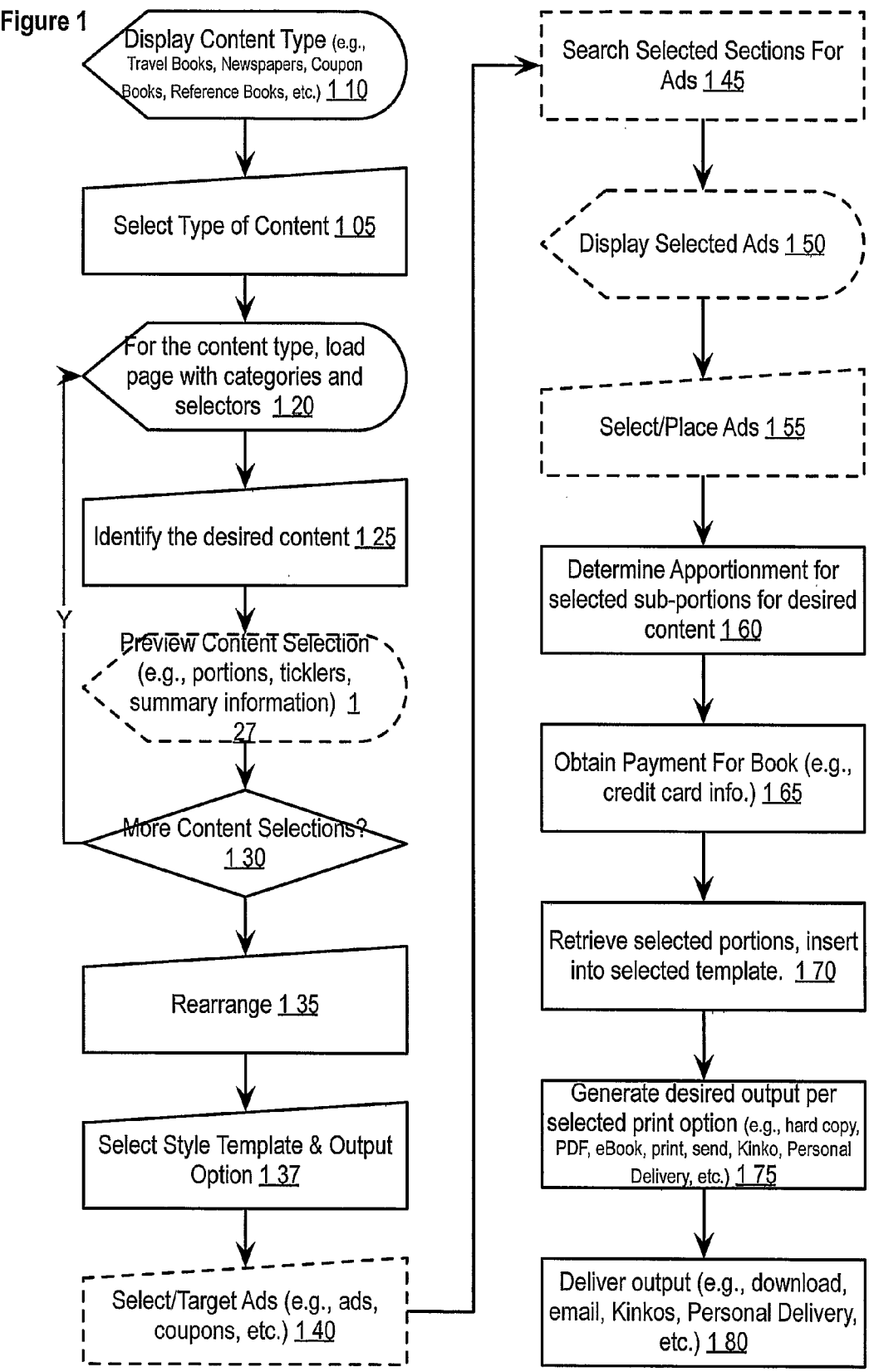
FIG. 1 shows a logic-flow diagram illustrating embodiments of a Composite Content Generator.

FIG. 1 shows a logic-flow diagram illustrating embodiments of a Composite Content Generator. In one embodiment, a user is presented with options to select varying content types 110. For example, in FIG. 3, one can see a web browser 305, visiting a web address 310 from which the Composite Content Generator may be accessed, and where the Composite Content Generator provides a user with a web page 315 allowing a user to select a desired content type 320. As such, the user may select among a variety of content types 105 such as Audio, Travel Books, Newspapers, Coupon Books, Self-help (books and guides in areas such as wedding planning, baby books, exercise, diet, self improvement, etc.), Reference Books (e.g., medical journals, legal research, etc.), Recipe Books, Magazines, Video, information service providers (news segments and/or RSS feed segments from sources like Yahoo! News, PRNewswire.com, West news sources, Factiva, etc.), and/or the like.

Upon making a content type selection 105, the Composite Content Generator will retrieve a selector profile for that content type. The selector profile allows a user to specify various attributes and/or otherwise conduct searches for content that is a member of the content type that they selected.

Thus, if the user selected a content type of "Travel Books" a selector profile might include selectors that allow a user to specify a geographic region. For example, in FIG. 3 one can see a web browser 305 where a geography selector 316 has been retrieved and provided to a user; wherein the user may then select a geographical region by country 325, state 330, city 335, postal code 340 and/or the like. The selector profile may be loaded from a Composite Content Generator database. In one embodiment, the selector profile is a web page. In another embodiment, the selector profile is an XML description that links data sources and may be employed by an information server and/or database system to generate a web page. For example, the following is an XML description for a selector profile for Travel Books that coincides with options in FIG. 3 305b and 305cc:

```
<selector>
    <travel_books>
        <country>United States</country> 325
        <state>NJ</state> 330
        <city>Edison</city> 335
        <postal_code>08820</postal_code> 340
        <selection_1>
            <book_code>ISBN 1234567890</book_code>
            <chapter_1>No</chapter_1>
            <chapter_2>Yes</chapter_2> 355c
            <chapter_3>No</chapter_3>
            <chapter_4>No</chapter_4>
        </selection_1>
        <selection_2>
            <book_code>ISBN 22222222</book_code>
            <chapter_1>No</chapter_1>
            <chapter_2>Yes</chapter_2> 355c
            <chapter_3>No</chapter_3>
            <chapter_4>Yes</chapter_4> 355c
            <chapter_5>No</chapter_5>
        </selection_2>
    </travel_books>
</selector>
```

Figure 3:
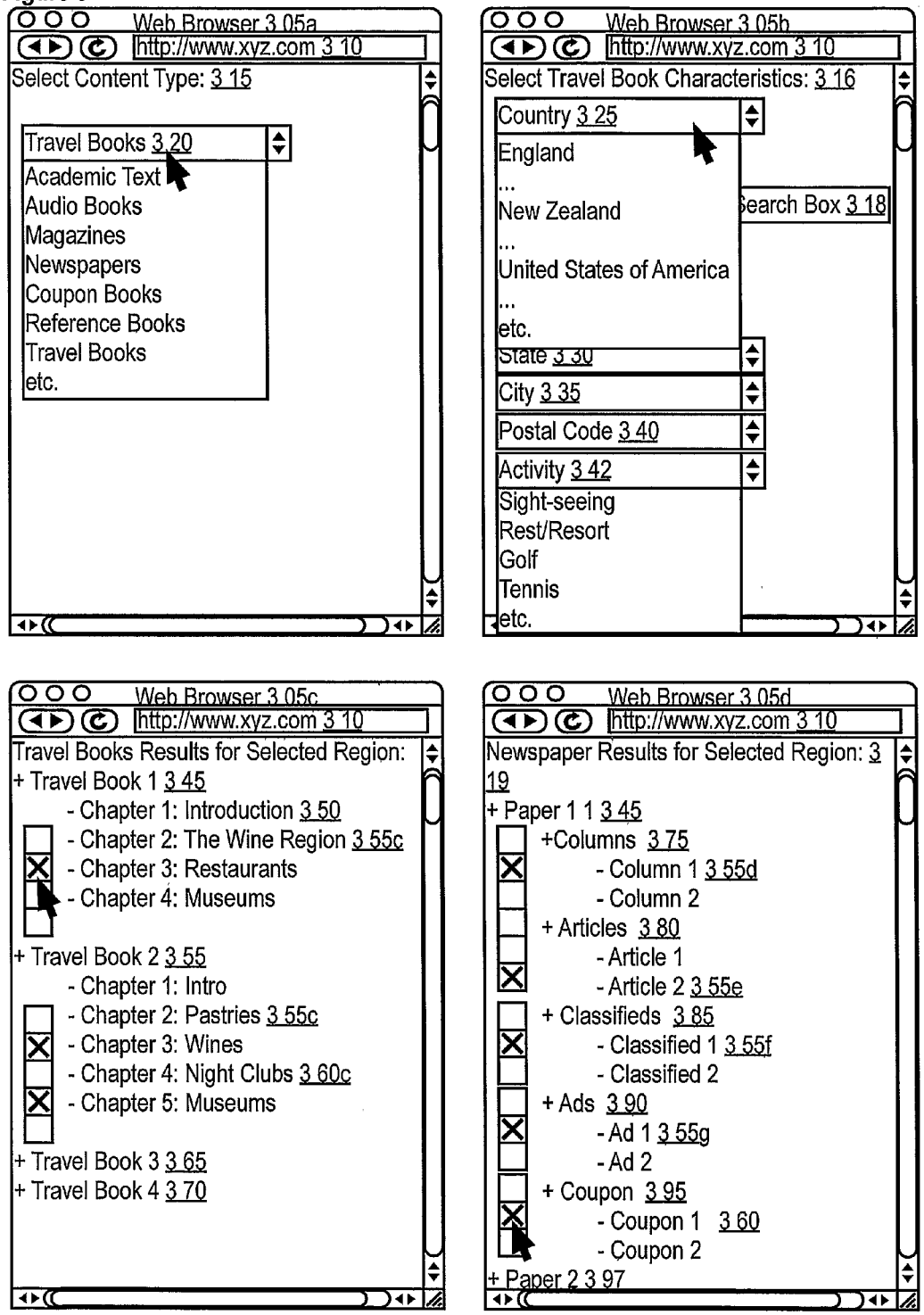
FIGS. 3 and 4 show block diagrams illustrating embodiments of user interfaces for a Composite Content Generator.

It should be noted that the above example shows a snapshot that has been augmented by user selections in FIG. 3 355c, 360c. In one embodiment, the selector is generated by reading a selector template for the content type, and is further modified by the specifics of matching content offerings. For example, an initial selector for Travel Book content type might have the following XML description:

```
<selector>
    <travel_books>
        <country>country_field_table_link</country>
        <state>state_field_table_link</state>
        <city>city_field_table_link</city>
        <postal_code>postalcode_field_table_link</postal_code>
        <selection_feeds>
            <book_code>contentID_field_table_link</book_code>
            <chpt_available>chpt_field_table_link</chpt_available>
            <section_available>
                section_field_table_link
            </section_available>
            <article_available>
                no
            </article_available>
            <maps_available>map_field_table_link</available>
            <ads_available>No</ads_available>
            <coupons_available>No</coupons_available>
        </selection_feeds>
    </travel_books>
</selector>
```

As can be seen above, the initial template may be used to query the Composite Content Generator database for lists of options for each XML field entry. For example, the <country> tag may have a "country_field_table_link" that points to the Composite Content Generator table having a list of countries (e.g., a templates table). By searching for values matching that "country" tag, a list of countries will be returned. In one embodiment, searches may be generated by using just the XML tags, or the XML tags with listed values as the basis of SQL select requests on the target Composite Content Generator database tables. The results of the search may then be used by the Composite Content Generator user interface to populate its popup-list options (for example, see FIG. 3 325). For example, this returned list may be used to modify the selector as follows:

```
<selector>
    <travel_books>
        <country>Argentina, New Zealand, United States of America...</country>
```

Similarly, other links to the database may be used to populate the selector with specific options for the user to narrow their content selectors. As users make selections of countries, or cities, searches on those tags or selections may ensue to modify their options. Thus, if a user selects a city, book_codes for that city will be returned and be provided to the user. In turn, as book_codes are returned and/or selected, the Composite Content Generator may search those book_codes to identify if there are chapters, maps, ads, coupons, or other content sub-types that are available for individual purchase and/or selection for that book_code. Thus, if a content type or a specific content type selection (e.g., a selected book) has no coupons or ads in it, no option for selecting ads or coupons will be provided via the user interface via the selector. In this way, users will be presented with only as much information as meets their specified interests.

It should be noted that implementations other than XML for marking selections and designating selectors may be employed. For example, tab and/or character delineated lists, structured lists, descriptive headers, Flash based user interfaces, a series of HTML web form pages with table links, text and/or binary versions of such data structures, and/or the like may be employed.

Moving back to FIG. 1, after a type of content is selected by the user 105, a web page with the appropriate categories and/or selectors is loaded 120. This may be achieved by querying the Composite Content Generator database for the appropriate selector for the selected content type. For example, once a content type is selected 105 (e.g., see FIG. 3 305a or FIG. 4 410), a selected tag (e.g., Academic Text, Audio Book, Coupon Book, Magazines, Newspaper, Reference Book, Travel Books, RSS feed, etc.) may be used as a basis to look up selector templates from a Composite Content Generator database from a template table. Upon retrieving the appropriate selector and providing a user interface for display to the user 120 (e.g., a web page, a web page generated from the specifications and data links specified in the selectors, and/or the like), the user may then specify categories and other filters 120 (e.g., see FIG. 3 305b, 325, 330, 335, 340, 342). These tags associated with the user's selected categories and/or filters are then used to query the Composite Content Generator, which will then return and populate the display with content offerings from which the user may make selections 125 (e.g., see FIG. 3 305c, 345, 355, 365, 370). In one embodiment, optionally, the listings of content offerings may include the ability to preview (e.g., see FIG. 4 471, 472) the content offerings 127. In some embodiments, the previews may include portions of the content, teasers, summary information (e.g., number of pages, minutes of video, format options, price, publisher, and/or the like), and/or the like. Regardless, the users may identify the content they are interested in 125 (e.g., optionally, after previewing the content offerings 127) by providing indication of interest to the portions of the content offerings of interest. That is, for each content offering, the Composite Content Generator may use the selector to obtain the available portions of the content that are available individually. For example, in FIG. 3 305*c*, Travel Book 1 345 has four available chapters from which the user may make selections 125, and the user has employed a cursor to select the "Chapter 2: The Wine Region" 355*c* portion of the book. As such, in one embodiment, by clicking on the content offering listings (e.g., see FIG. 3 305*c*, 345, 355, 365, 370), that listing's sub-parts (e.g., the chapters) may be expanded so the user may both browse and/or make selections of the sub-parts. The user may continue to make as many selections as they like, and moreover, they may move back to make composite works by iterating through the selection 130, 120. In another example, a user may decide to use information segments from information service providers like Factiva, Yahoo! News, and/or the like; in such an embodiment, users may select various RSS feed links and/or story segments that will be used to comprise the composite work. In one embodiment, users may make inter-type composite works by iterating back to the selection of types of content 105. As the user iterates, the Composite Content Generator keeps track of all user selections. In one embodiment, the user selections are maintained in a cookie on the user's computer. In an alternative embodiment, the user selections are sent to the Composite Content Generator (e.g., via http(s) post commands) and saved in a session in the Composite Content Generator.

When the user does not desire any more content items and/or sub-items 130, the user may rearrange all the selections into an order of their liking 135. In one embodiment, a summary list of all user sub-item selections is presented, and a user may select items in that list and move items up and down the list to an order of their liking (e.g., See FIG. 5 540).

Upon rearranging the selected content portions into a desired arrangement 135, the user may be presented with style template and print options 137. In one embodiment, pop-up selections may be employed for the user to choose various styles. In another embodiment, a template list 705 of FIG. 7 including various style previous (e.g., Travel journal style 710 of FIG. 7) me be used from various applications (e.g., Apple's Pages). The numerous templates may be saved in the Composite Content Generator database. In one embodiment, numerous style templates are stored for each type of output option. Thus, if the output target is a text book, a number of desktop layout templates may be use to accept the text and image content portions, wherein each portion would be given its own section separator in the text template. For example, in one embodiment, Adobe InDesign, Framemaker, Pagemaker, Quark, TeX, and/or the like templates may be designed by artists and be used as containers for the selected content portions. Upon populating the templates, the resulting files may be saved and made available for download and/or rastered (e.g., output to PDF, eBook, hard copy, and/or the like formats). Similarly, video templates may be used to generate DVDs by using templates from programs like Apple's iDVD (e.g., see 720, 730 of FIG. 7), DVD studio, and/or the like, whereby selected content portions become DVD chapters. In an alternative embodiment, the selected video portions may be appended one after the other and output into a single video file format (e.g., Windows Media Format, MPEG 4, and/or the like). The user may also be presented with a screen to select output options. In one embodiment, a pop-up menu may allow a user to select the options, for example, such as: download (eBook, PDF, Word, text, etc.), hard copy (paper: 6×8", 8×11", etc.; CD: audio, MP3, AAC, etc.; DVD: video, MPEG 4, etc.; and/or the like), and/or the like. In one embodiment, the user is presented with a screen that allows them to select the template and/or output options from a series of preview icons (e.g., see FIG. 6 601). In another embodiment, the selected content portions may be funneled into external applications (e.g., such as Pages 710 and iDVD 720) via Apple scripts, which may then be further saved as PDF format files.

Upon selecting a style template and/or output options 137, the user may select ads to be included in their customized composite work 140. It should be noted that although ads are mentioned in this optional embodiment 140, 145, 150, 155, that in an alternative embodiment, coupons may be employed as well. Some types of content may include advertisements. For example, travel books may include numerous ads and/or coupons that are related to the context and areas covered by the book. Another example may include newspapers or magazine types of content where ads and/or coupons are placed. As such, in one embodiment, a user may be provided with the ability to select the types of ads and/or coupons that they would find useful. For example, a user may specify that they are only interested in restaurant and hotel advertisements for the selected cities in a travel book. In one embodiment, a selector is employed to allow users to make category and filter selections for the types of ads for which they have an interest. In an alternative embodiment, a user may actually browse various ad genres, product categories, and/or companies for which ads will be supplied. In another embodiment, ads are selected by the Composite Content Generator, and not by the user, based on context (e.g., such as a geographical area for a travel book) from ads supplied by advertisers (e.g., for a given region), such ads being stored in a Composite Content Generator database; in such a manner advertisers are able to target users with ads. Upon making the ad selections 140, the tags from the user selections may be used as a basis for searching the Composite Content Generator database's ad table for matching ads. Upon identifying matching ads, those ads may, optionally, be provided for display to the user 150, and the user may further be allowed to make selections 155 of ads for inclusion in their composite content. Alternatively, ads may be automatically selected and placed within the composite work automatically based on the context of the composite work. In yet another embodiment, a user may pay extra to not include any ads and/or coupons in their composite work. Advertisers pay to have their ads made available for inclusion of composite works via the Composite Content Generator's database.

Upon selection of a template and output option 137 or optionally upon selection of ads for inclusion 155, the Composite Content Generator may then determine apportionment for selected sub-portions for desired content 160. In one embodiment, a user is charged a prorated portion of the total cost of a desired content item. For example, where a user selects one chapter out of a total of 10 chapters in a first book that costs $10 and two chapters out of 10 in a book that costs $20, the user would be charged $\frac{1}{10}^{th}$ the cost of the first book ($1) and $\frac{2}{10}^{th}$ the cost of the second book ($4) for a total charge of $5. In an alternative embodiment, each work may have a profile where different sub-portions of the work have specific charges and/or specific apportionments. For example, a particular book may have a first chapter that is deemed to be 50% the value of the entire work. In another example, a publisher may wish to charge a flat fee (e.g., $5) for each sub-portion of a work even though the sum of the sub-portions would add up to more than the cost of the entire work. In yet another example, a publisher may wish to charge less for the sub-portions. Numerous volume discounts and other pricing variations are contemplated as being within the scope of the Composite Content Generator.

Upon determining apportionment for selected sub-portions of desired works 160, the Composite Content Generator may provide a final charge for which the user may provide payment information. In one embodiment, the user may enter credit card information from the user into a web form. Upon obtaining the credit card information and charging the card 165, the Composite Content Generator may then retrieve the user selected sub-portions of desired works and insert those portions into any selected templates 170.

In one embodiment, the Composite Content Generator searches its content database table for matching sub-portions and retrieves those portions. The various content types may be digitized and/or otherwise collected and stored in the content database. In one embodiment, content is collected from the publishers and tagged with metadata. As such, the content of a book may be broken up into its various section components and saved into the fields of the Composite Content Generator content database table. In one embodiment, the retrieved sub-portions may then be placed into the retrieved templates via an Application Programming Interface (API) as supplied by the application supporting the template. In an alternative embodiment, a script may be used to copy retrieved content sub-portions and paste them into selected templates. In one embodiment, such data may be fed via database adapters.

Upon compositing the selected content sub-portions 170, the Composite Content Generator then determines the desired output for the composite work based on the users output option selection 137, 175. Depending on the content type and the desired output, the generation of the final output may vary. For example, when books, magazines, newsprint and/or like media types are the content basis, output options may include downloads and/or hardcopy options; however, the download options might be limited to eBook and/or PDF output formats and hardcopy output options may be limited to physical printouts. Alternatively, if the content basis type were videos, then download options may include Windows Media Video formats while physical output may be limited to DVD formats. Upon generation of the desired output format 175, the output is provided for delivery 180. For example, if the desired output was a download, then the file would be provided for download by providing a user with a link that would prompt the Composite Content Generator to initiate an FTP and/or http transfer of the composited file from the Composite Content Generator to the user's computer. Alternatively, if a physical composited work has been generated (e.g., a print out that has been bound, a CD, a DVD, and/or the like), that physical composited work may be then shipped to a user's address for personal delivery, made available at a local Kinkos, and/or the like 180. For example, a generated 175 version of the composited work may be emailed and/or otherwise transferred to a Kinkos local to the user where it may be printed out or saved to an optical medium and made available for pick-up by the user.

Coupons

Figure 2:
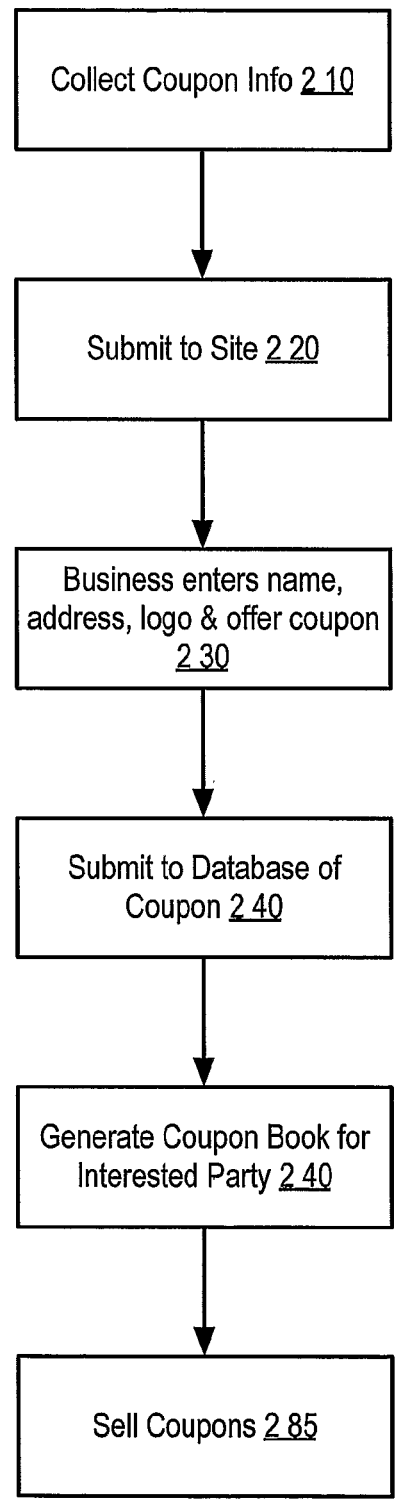
FIG. 2 shows a logic-flow diagram illustrating embodiments of a coupon generation for a Composite Content Generator.

FIG. 2 shows a logic-flow diagram illustrating embodiments of a coupon generation for a Composite Content Generator. In one embodiment, a user and/or group of users, i.e.,
coupon initiators, collect coupon information 210. For example, a little league baseball team wishing to raise money for new uniforms may approach several community businesses (e.g., the local Pizza parlor, a bowling alley, the a supermarket, and/or the like) asking if they would like to supply coupons for a team coupon book that will be sold to local residents. If the local establishments assent, the team might collect basic information such as the name of the establishment, the product offerings, email address, and the amount of the coupon 210. Upon taking such coupon information 210, the team members may go to a web site to enter coupon participant information into a web form 220, which will in turn store this information in an advertiser table in the Composite Content Generator database. Upon entering such information, an account for the coupon provider may be generated if no account yet exists and an email or physical mailing is sent to the coupon participant so that they may enter the coupon participant web site. Upon receiving the mail with a supplied link, the coupon participant may then follow the link to a web form allowing for the further customization of coupons for use by the coupon initiators. The coupon participants may upload logos, refine the product and our coupon amounts, update their participant information (e.g., address, directions, expiration dates for the coupons, and/or the like), and/or the like 230. Upon completion 230, the coupon may be submitted to the Composite Content Generator's ad/coupon table where it will be stored and will include tags referencing the coupon initiators and their project (e.g., coupon book for the 2007 uniform drive, etc.) 240. Upon submission of coupons by all coupon participants 240, coupon initiators may then arrange the coupon books in a manner similar to what was already discussed in FIG. 1 125, 127, 130, 135, 137 and further generate the coupon books similarly to the discussions in FIG. 1 160, 165, 170, 175, 180. However, rather than determine a percentage of apportionment as in 160 of FIG. 1, a charge is established for the coupon participant for their participation in the coupon book for the coupon initiators. The proceeds are collected and split as between the operators of the Composite Content Generator and the coupon initiators. In one embodiment, the proceeds are split equally. In another embodiment, the proceeds are used to discount the costs of generating a physical coupon book. Upon generation of a physical coupon book, the coupon initiators may take such coupon books and sell the books 285 to community members. In one embodiment, the coupon initiators are charged for the physical generation of coupon books for sale.

In another embodiment of the coupon component, each coupon book may be sold for a geographic region based on the popular restaurants and other attractions in the area. If you wanted to have one of these books for yourself—perhaps as a fundraiser idea for your small organization—you could have your name embossed on the cover of the book. This embodiment allows a small group such as a baseball team, scout organization, or other to not only customize the cover of the book, but to also decide which businesses will be represented and which coupons will appear inside the book. In effect, customers may create their own custom coupon book from cover to cover by:

1) Printing a fundraiser kit
2) Using the kit to sign up local merchants in a local area
3) Putting the coupons in order and adding any options
4) Purchasing and printing coupon books The coupon component allows a potential customer to pay for and download a fundraiser kit. In one embodiment, this kit is partly paper based and partly Internet based. The paper component is where users collect the names, email addresses and signatures of business owners that wish to participate in the coupon book program which they are producing. The electronic component will enable them to enter the merchant names and then send the merchant, via email, a URL at which the merchant will be able to custom create a coupon. Each merchant may then create their own coupon in our application which will enable them to create three specific components. First, they will put in the business name and address. Next, they will put in the business logo or other graphic. And finally, they will put in the offer—such as 20% off, 2 for 1, etc. When the merchant has finished certain coupon, they may press a "Done" indicator (e.g., a button) and will be entered into the list of "done coupons." After, a customer may go into an online application and create their coupon book. They will take all of the done coupons and put them into order, groups, etc. They will design their cover in a similar fashion to that which the merchants did when they created the coupons. Then, the user may select the output format, the number of books and to buy them. Typically, this will mean they select whether or not they want their coupon books to have a plastic or paper cover, a particular list price on the cover and if they want to add any template/standard content. Next, they will find the price per 20, 50, 100, units (or more). The users will then be able to put this order into a shopping cart, place and pay for the order. Thereafter, the users will have coupon books for sale—at a much higher price so they may profit.

Interfaces

Figure 4:

FIGS. 3 and 4 show block diagrams illustrating embodiments of user interfaces for a Composite Content Generator. The figures show a web browser 305, 405, each at an address 310, 410 where a Composite Content Generator provides access to its facilities (in one embodiment through an information server). In one embodiment, a user may first be presented with content 315 generated from a selector, as has already been discussed in FIG. 1. As such, the Composite Content Generator provides the user with the ability to select the different types of content 320 from which the user may make selections. Upon selecting a content type 320 in the first web browser 305a content window 315 (e.g., Travel Books), the user may then be presented with an interface derived from a selector for that content type 305b, 316. In this case, the selector provides the ability to select a country 325, state 330, city 335, postal code 340, and/or activity 342 via pop-up menus and a free form search box 318, all of which may obtain user categories and terms with which to filter and select Travel Books of interest. The sum of user selections in the web browser 305b, 316 will be used as basis to query the Composite Content Generator for matching content (i.e., in this case Travel Books). These results are then provided back to the web browser 305c as results of available content offerings 318, 345, 355, 365, 370. This resulting list of content offering results 318 may be expanded to show sub-offerings 350, 355c, 360c from which the user may make selections of desired partial content offerings 355c, 360c. The view in the last browser of FIG. 3 305d shows the results had the user chosen to search for newspaper types of content 319. In this example, the user selected a column 355d, an article 355e, a classified ad 355f, one ad 355g and one coupon 360d for the basis of their composite content. More selections may be made from other newspaper results 397 as well.

FIG. 4 goes on to illustrate an example where a user wants to make a composite work from videos. In this case the user initially selects the video content type 420. The user may then select categories of countries from where the user wishes to find videos and genres of videos 442. In this example the user selected exercise videos, which yielded a listing of three videos 445, 455, 465 as seen in the 405c web browser. There, the user made selections of a Cardio component 455c from one video, and a warm up 455d and relaxation component 460c from a second video. Also, the user has engaged a preview button 471 for the aerobic chapter offering from the second video, which results in a teaser video 472 being shown to the user for evaluation. As such, the composite work that would result from such selections would include Chapter 2 from Video 1, and Chapters 2 and 4 from Video 2.

The last web browser in FIG. 4 405d shows a sample results page for audio book results.

Figure 5:
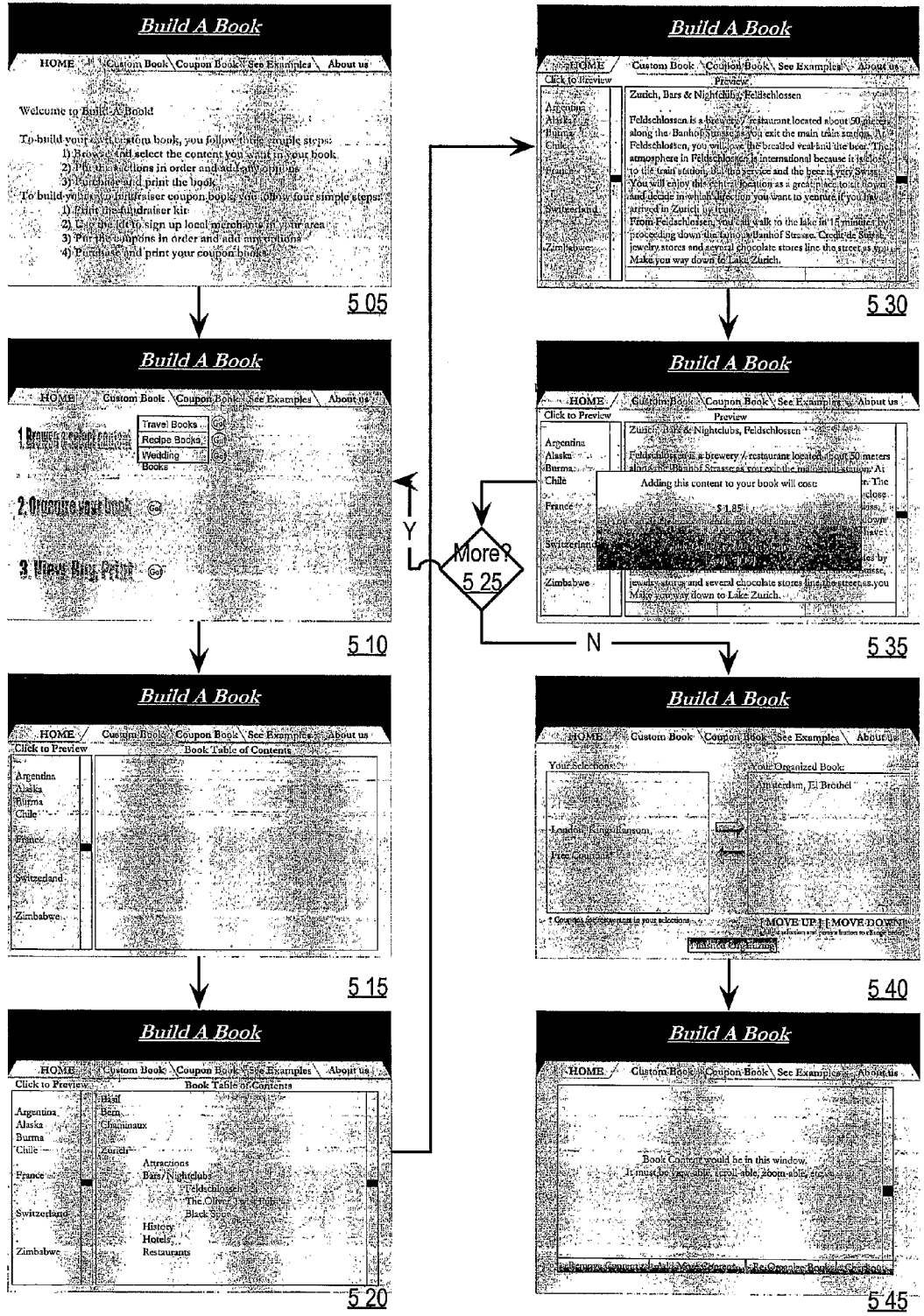
FIG. 5 shows a logic-flow diagram illustrating embodiments of an interface flow for a Composite Content Generator.

FIG. 5 shows a logic-flow diagram illustrating embodiments of an interface flow for a Composite Content Generator. In one embodiment, a user initially comes to a web page hosted by the information server of a Composite Content Generator 505. The web page may have a tabbed folder layout allowing a user to view custom books, coupon books, see various template examples 505. Upon making a selection to make a custom book, the user may select a content type 510. Upon selecting type of content 510, the user may then select a region from which to draw matching content 515. After selecting a country (e.g., Switzerland), the web page may provide a further list of cities 520. Upon identifying a city, a preview of various content for that region may be displayed 530. Upon making selections of desired content portions, a user may be prompted to confirm that they wish to pay for the selected content type and that selection will be saved 535. If the user wishe 525, they may continue to make more selections of types of content and add to their building composite work 510 through iteration 525. Upon making all their selections 525, the user may reorganize the selections into an ordering of their liking 540. Thereafter resulting composite work contents may be provided to the user for approval 545 and eventual purchase and generation of the final composite content.

Interfaces

Figure 6:
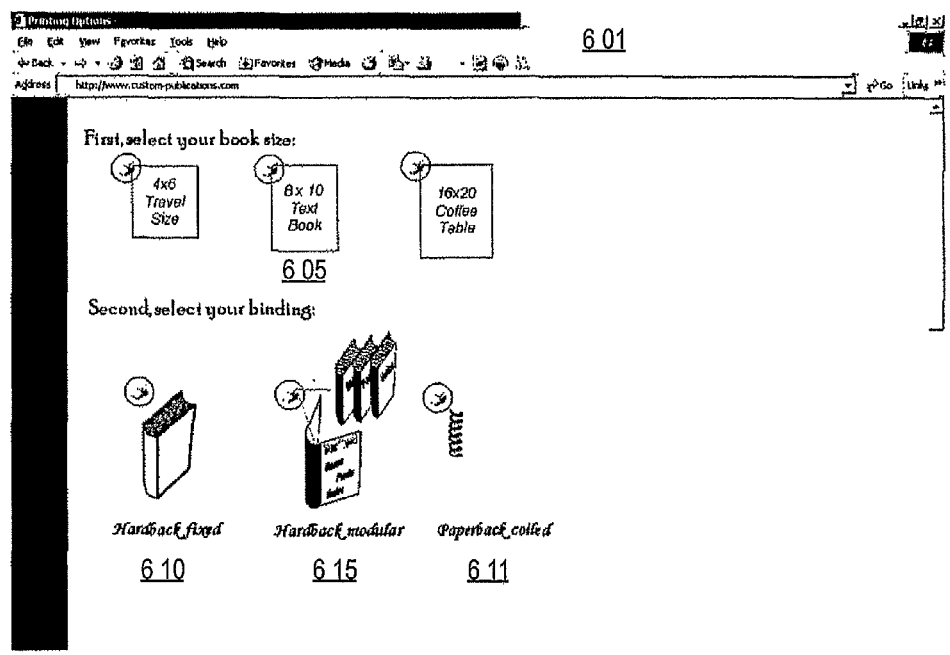
FIG. 6 shows a block diagram illustrating embodiments of output options for a Composite Content Generator.
Figure 6:
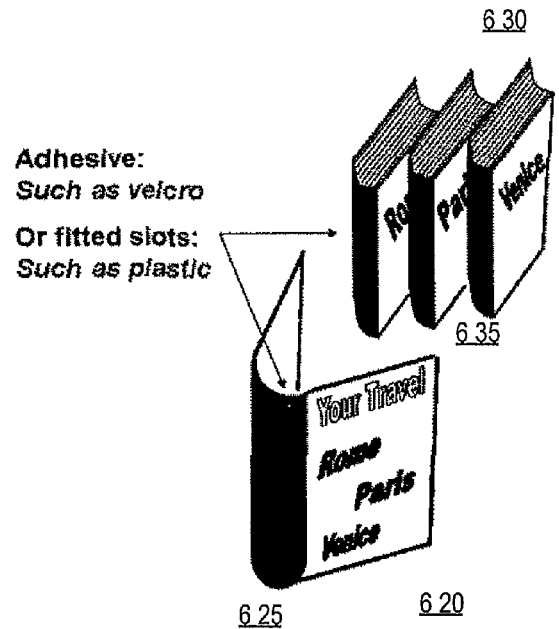
Figure 7:
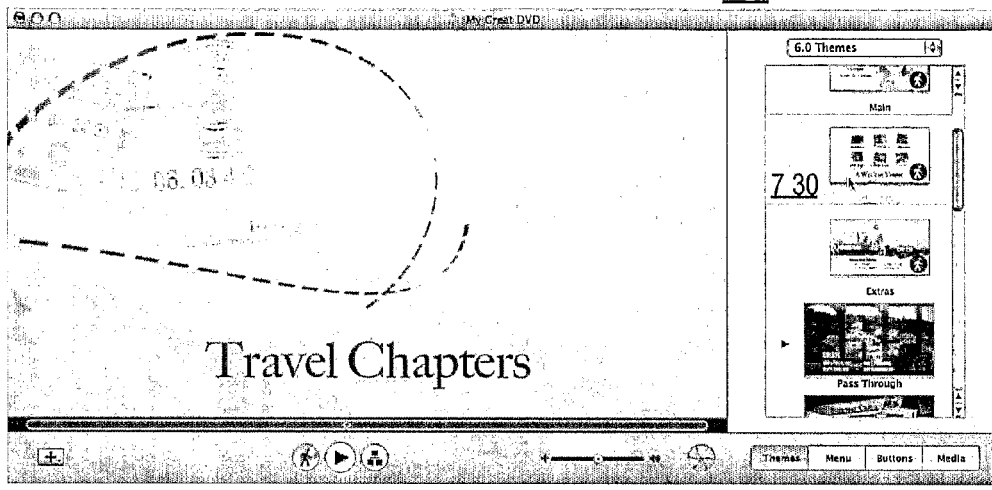
FIG. 7 shows a block diagram illustrating embodiments of external template styles that may be used as output containers for a Composite Content Generator.
Figure 7:
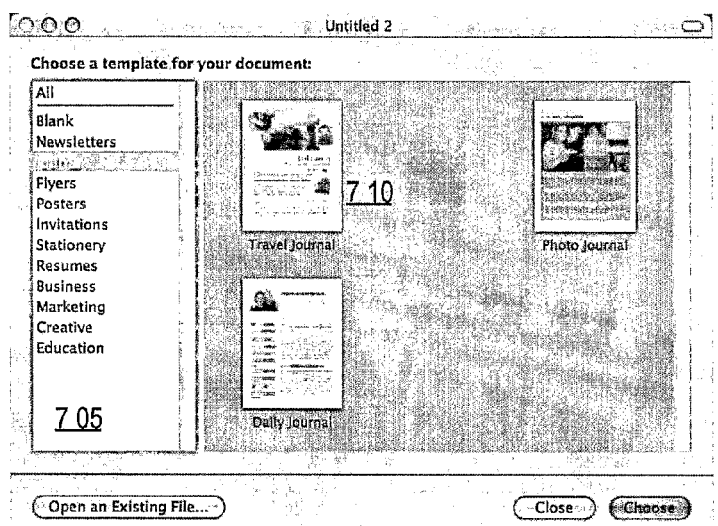
Figure 7:
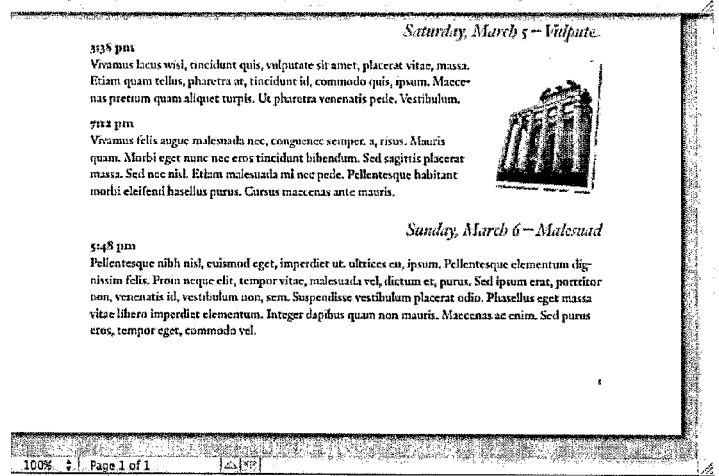

FIG. 6 shows a block diagram illustrating embodiments of output options for a Composite Content Generator. In one embodiment, a user makes selections in a web browser 601 of templates 605 and output options 610, 615 that they may want for any resulting composite content. For example, the user may select from templates of various sizes for a travel book 605. As for output options, in one embodiment a user may simply choose to output the resulting composite content (e.g., a Travel Book) to paper hard copy which may be simply bound 610, spiral bound 611 or made into a modular book 615.

The modular book may be comprised of a cover 620 having an inner binding 625 that includes a Velcro surface affixed to the inside of the cover with an adhesive. In one embodiment, strips of VELCRO® (e.g., Industrial Strength with Heavy Duty Adhesive strips that come in 1.2 meter lengths) may be cut to the same height as the cover 620 and affixed to the inner binding 625 of the cover 620. Similarly, printed and bound copies of the partial content selections 630 may each have a complementing Velcro strip affixed to its outer binding 635. As such, the Velcro bound selections 635 may then be affixed inside the cover 620. Such an embodiment allows a user to only put in those partial content selections that are of interest at a given time. For example, if a user generates an academic composite work, the student need only affix the chapters required for a given day's lesson in the modular Velcro binding 635, 620 and thereby reduce the amount that the student needs to carry to class.

In another embodiment, the modular book is designed to make it easier to separate the different sections of a personalized travel book. This unique structural design will also afford the traveler more flexibility in creating and only keeping the relevant sections of a travel book. This embodiment affords travel book manufacturers, travel agencies and self directed travel planners a cost effective solution to providing specialized and specific guides that match the requirements of the customer.

Composite Content Generator Controller

Figure 8:
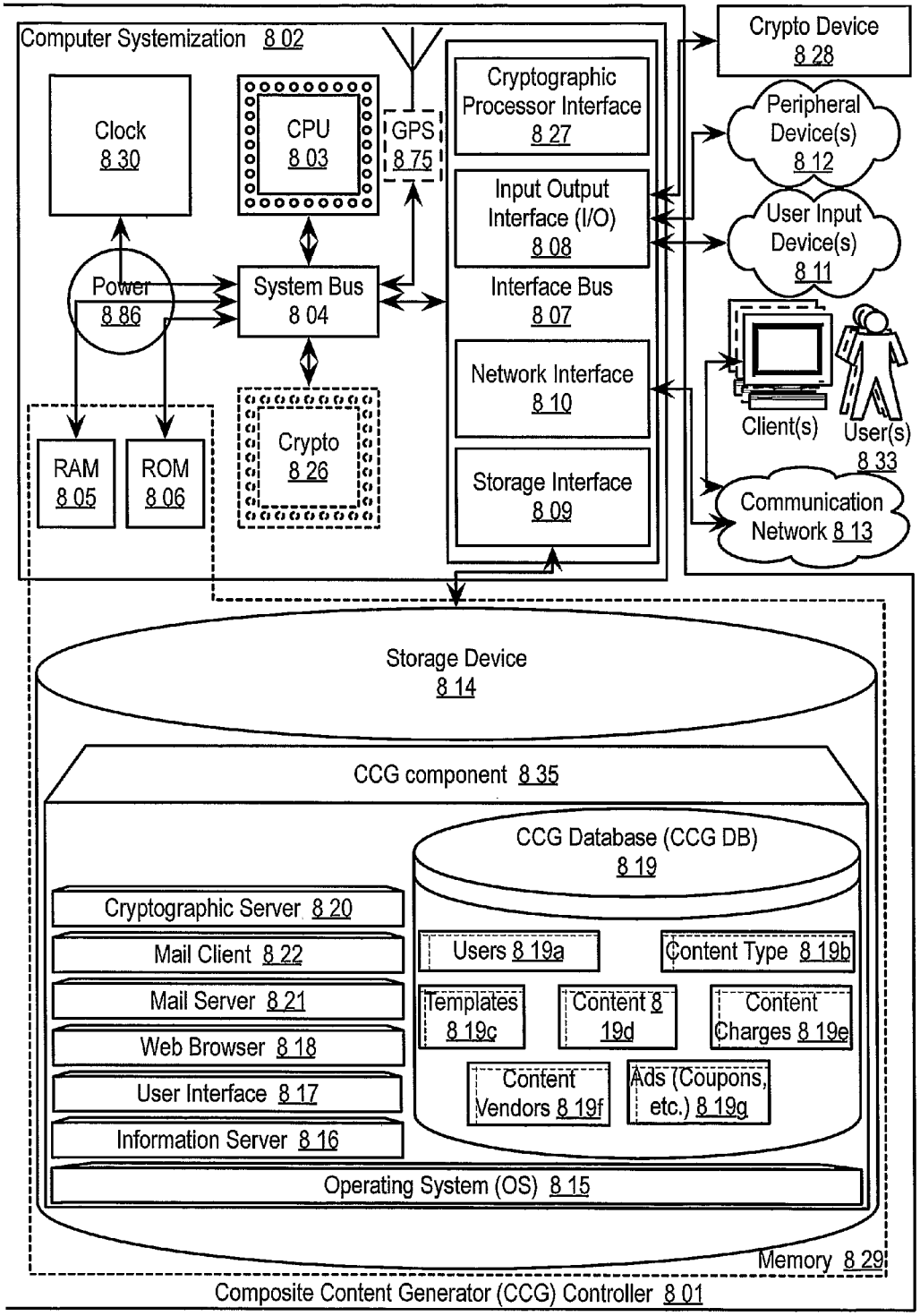
FIG. 8 shows a block diagram illustrating embodiments of a Composite Content Generator controller.

FIG. 8 shows a block diagram illustrating embodiments of a Composite Content Generator controller 801. In this embodiment, the Composite Content Generator controller 801 may serve to aggregate, process, store, search, serve, identify, instruct, generate, match, and/or facilitate interactions to view, select, and enable the purchase portions of various works (e.g., such as books, periodicals, reference materials, and/or the like) and provide the fulfillment of a user purchase as a customized publication, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the Composite Content Generator system controller 801 may be connected to and/or communicate with entities such as, but not limited to: one or more users from user input devices 811; peripheral devices 812; a cryptographic processor device 828; and/or a communications network 813.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Composite Content Generator system controller 801 may be based on common computer systems that may comprise, but are not limited to, components such as: a computer systemization 802 connected to memory 829.

Computer Systemization

A computer systemization 802 may comprise a clock 830, central processing unit (CPU) 803, a read only memory (ROM) 806, a random access memory (RAM) 805, and/or an interface bus 807, and most frequently, although not necessarily, are all interconnected and/or communicating through a system bus 804. Optionally, the computer systemization may be connected to an internal power source 886. Optionally, a cryptographic processor 826 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Composite Content Generator system controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the Composite Content Generator system thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 113, the Composite Content Generator system controller is accessible through remote clients 833*b* (e.g., computers with web browsers) by users 833*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 811 may be card readers, dongles, finger print readers, gloves, graphics tablets, joysticks, keyboards, mouse (mice), remote controls, retina readers, trackballs, trackpads, and/or the like.

Peripheral devices 812 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Composite Content Generator system controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the Composite Content Generator system controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the Composite Content Generator system controller and/or a computer systemization may employ various forms of memory 829. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., CD ROM/RAM/ Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the Composite Content Generator system component(s) 835; and/or the like (i.e., collectively a component collection). These components may be stored and accessed from the storage devices and/or from storage devices accessible through an interface bus. Although non-conventional program components such as those in the component collection, typically, are stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the Composite Content Generator system controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh QS, Microsoft DOS, Microsoft Windows 2000/2003/3.1/95/98/ CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Composite Content Generator system controller to communicate with other entities through a communications network 813. Various communication protocols may be used by the Composite Content Generator system controller as a subcarrier transport mechanism for interaction, such as, but not limited to: multicast, TCP/IP, UDP, unicast, and/or the like.

Information Server

An information server component 816 is a stored program component that is executed by a CPU. The information server component may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Composite Content Generator system controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Composite Content Generator system database 819, operating systems, other program components, user interfaces, Web browsers, and/or the like.

Access to the Composite Content Generator system database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Composite Content Generator system. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Composite Content Generator system as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 817 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Composite Content Generator system enabled nodes. The combined application may be nugatory on systems employing standard Web browsers.

Mail Server

A mail server component 821 is a stored program component that is executed by a CPU 803. The mail server may be a conventional Internet mail server such as, but not limited to sendmail, Microsoft Exchange, and/or the. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Composite Content Generator system.

Access to the Composite Content Generator system mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Composite Content Generator system may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Composite Content Generator system component to engage in secure transactions if so desired. The cryptographic component facilitates the secure accessing of resources on the Composite Content Generator system and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Composite Content Generator Database

The Composite Content Generator database component 819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Composite Content Generator database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, QbjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Composite Content Generator system database is implemented as a data-structure, the use of the Composite Content Generator database 819 may be integrated into another component such as the Composite Content Generator component 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 819a-e. A users table 819a includes fields such as, but not limited to: a user name, ip_address, email address, address, payment information (e.g., credit card information), usage_profile, transaction_history_id, user_id, and/or the like. An content type table 819b includes fields such as, but not limited to: content_id, selector_id, category_id, and/or the like. A template table 819c includes fields such as, but not limited to: template_id, template, category_id, digital_rights_ setting, supported_output_format, and/or the like. A content table 819d includes fields such as, but not limited to: content_id, content, template_id, vendor_id, section_selector_id, and/or the like. A content charges table 119e includes fields such as, but not limited to: content_id, section_selector_id, charge, vendor_id, and/or the like. A content vendor table 119f includes fields such as, but not limited to: company_id, company name, company address, content_id, and/or the like. An ads table 119g includes fields such as, but not limited to: company_id, user_id, campaign_id, ad_id, coupon expiration, ad content, logo, and/or the like.

In one embodiment, the Composite Content Generator system database may interact with other database systems. For example, employing a distributed database system, queries and data access by Composite Content Generator system component may treat the combination of the Composite Content Generator system database, an integrated data security layer database as a single database entity.

In one embodiment, user programs may contain various user interface primitives, which may serve to update the Composite Content Generator system. Also, various accounts may require custom database tables depending upon the environments and the types of clients the Composite Content Generator system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819a-e. The Composite Content Generator system may be configured to keep track of various settings, inputs, and parameters via database controllers.

The Composite Content Generator system database may communicate to and/or with other components in a component collection, including itself, and/or facilities of the like. Most frequently, the Composite Content Generator system database communicates with the Composite Content Generator system component, other program components, and/or the like. The database may contain, retain, and provide information regarding other nodes and data.

The Composite Content Generator

The Composite Content Generator component 835 is a stored program component that is executed by a CPU. The Composite Content Generator affects accessing, obtaining and the provision of information, services, transactions, and/or the like across various communications networks. In one embodiment, the Composite Content Generator component 135 incorporates all the aspects of the Composite Content Generator discussed in the previous Figures.

The Composite Content Generator component enables and provides a straightforward, unified, and transparent interface that automatically presents users with a the ability to customize and generate composite publications and purchases thereof.

The Composite Content Generator component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the Composite Content Generator system server employs a cryptographic server to encrypt and decrypt communications. The Composite Content Generator system component may communicate to and/or with other components in a component collection, including itself, and/or facilities of the like. Most frequently, the Composite Content Generator system component communicates with the Composite Content Generator system database, operating systems, other program components, and/or the like. The Composite Content Generator system may contain, communicate, generate, obtain, and/or provide program component, system, user, and/or data communications, requests, and/or responses.

Distributed Composite Content Generator

The structure and/or operation of any of the Composite Content Generator node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Composite Content Generator controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method to produce a composite work, comprising:
providing types of content works for display,
wherein the types of content works are provided such that they are selectable, wherein the types of content works are read from a database,
wherein the types of content works include any of: audio works, video works, books, periodicals, and information service providers
wherein the books may include any of academic texts, reference books, travel books, self-help books,
wherein the periodicals may include any of magazines, newspapers, and
displaying the types of content works;
obtaining a selection from a requestor for a desired type of content work;
obtaining a selector for the selection of the desired type of content work, wherein the selector allows a requestor to provide user selections for desired content works;
obtaining user selections for desired content works, wherein the obtained user selections for desired content works was obtained via the selector;
effecting identification of content works matching the user selections for desired works;
obtaining content works and associated multi-source sub-portions matching the user selections for desired works;
displaying the matching associated multi-source sub-portions for each displayed content work, wherein the displaying allows a requestor to provide user selections for desired multi-source sub-portions;
obtaining user selections for desired multi-source sub-portions;
obtaining user selections for an order for the desired multi-source sub-portions;
displaying template options for a composite output format;
obtaining a selection for a desired template for a composite output format;
obtaining a selection of ads to be included in a composite work;
determining apportionment for the desired multi-source sub-portions, wherein each multi-source sub-portion is assessed as having a pro-rata value based on its percentage of a whole work, wherein apportionment is reduced by advertising;
obtaining payment information for a composite work, wherein a requestor will be charged based on output format selections and determined apportionment charges, wherein what is charged is reduced by advertising;
obtaining the desired multi-source sub-portions;
compiling the obtained desired multi-source sub-portions into the selected desired template output format into a composite work,
wherein the desired multi-source sub-portions of the composite work are ordered per the obtained order,
wherein the ads are included in the composite work,
wherein the ads are obtained from advertisers;
providing the composite work to the requestor.

2. The method of claim 1, wherein apportionment for each sub-portion is assessed as having a fixed value, wherein apportionment for multi-source sub-portions is reduced by advertising.

3. The method of claim 1, wherein ads are included in the composite work and the inclusion of ads is based on a selection of a type of ad.

4. The method of claim 1, wherein the output format selections include any of: electronic delivery and physical delivery including print outs.

5. The method of claim 4, wherein the print outs may be in a modular book format.

6. An apparatus for producing a composite work, comprising:
a processor; and
a memory disposed in communication with the processor, both the memory and the processor being include in a same device, and the memory storing processor-executable instructions to:
provide types of content works for display,
wherein the types of content works are provided such that they are selectable, wherein the types of content works are read from a database,
wherein the types of content works include any of: audio works, video works, books, periodicals, and information service providers
wherein the books may include any of academic texts, reference books, travel books, self-help books,
wherein the periodicals may include any of magazines, newspapers, and
display the types of content works;
obtain a selection from a requestor for a desired type of content work;
obtain a selector for the selection of the desired type of content work, wherein the selector allows a requestor to provide user selections for desired content works;
obtain user selections for desired content works, wherein the obtained user selections for desired content works was obtained via the selector;
effect identification of content works matching the user selections for desired works;
obtain content works and associated multi-source sub-portions matching the user selections for desired works;
display the matching associated multi-source sub-portions for each displayed content work, wherein the displaying allows a requestor to provide user selections for desired multi-source sub-portions;
obtain user selections for desired multi-source sub-portions;
obtain user selections for an order for the desired multi-source sub-portions;
display template options for a composite output format;
obtain a selection for a desired template for a composite output format;
obtain a selection of ads to be included in a composite work;
determine apportionment for the desired multi-source sub-portions, wherein each multi-source sub-portion is assessed as having a pro-rata value based on its percentage of a whole work, wherein apportionment is reduced by advertising;
obtain payment information for a composite work, wherein a requestor will be charged based on output format selections and determined apportionment charges, wherein what is charged is reduced by advertising;
obtain the desired multi-source sub-portions;
compile the obtained desired multi-source sub-portions into the selected desired template output format into a composite work, wherein the desired multi-source sub-portions of the composite work are ordered per the obtained order, wherein the ads are included in the composite work,
wherein the ads are obtained from advertisers;
provide the composite work to the requestor.

7. The apparatus of claim 6, wherein apportionment for each sub-portion is assessed as having a fixed value, wherein apportionment for multi-source sub-portions is reduced by advertising.

8. The apparatus of claim 6, wherein ads are included in the composite work and the inclusion of ads is based on a selection of a type of ad.

9. The apparatus of claim 6, wherein the output format selections include any of: electronic delivery and physical delivery including print outs.

10. The apparatus of claim 9, wherein the print outs may be in a modular book format.

11. A system for producing a composite work including a processor and comprising:
   means to provide types of content works for display,
      wherein the types of content works are provided such that they are selectable, wherein the types of content works are read from a database,
      wherein the types of content works include any of: audio works, video works, books, periodicals, and information service providers
      wherein the books may include any of academic texts, reference books, travel books, self-help books,
      wherein the periodicals may include any of magazines, newspapers, and
   means to display the types of content works;
   means to obtain a selection from a requestor for a desired type of content work;
   means to obtain a selector for the selection of the desired type of content work, wherein the selector allows a requestor to provide user selections for desired content works;
   means to obtain user selections for desired content works, wherein the obtained user selections for desired content works was obtained via the selector;
   means to effect identification of content works matching the user selections for desired works;
   means to obtain content works and associated multi-source sub-portions matching the user selections for desired works;
   means to display the matching associated multi-source sub-portions for each displayed content work, wherein the displaying allows a requestor to provide user selections for desired multi-source sub-portions;
   means to obtain user selections for desired multi-source sub-portions;
   means to obtain user selections for an order for the desired multi-source sub-portions;
   means to display template options for a composite output format;
   means to obtain a selection for a desired template for a composite output format;
   means to obtain a selection of ads to be included in a composite work;
   means to determine apportionment for the desired multi-source sub-portions, wherein each multi-source sub-portion is assessed as having a pro-rata value based on its percentage of a whole work, wherein apportionment is reduced by advertising;
   means to obtain payment information for a composite work, wherein a requestor will be charged based on output format selections and determined apportionment charges, wherein what is charged is reduced by advertising;
   means to obtain the desired multi-source sub-portions;
   means to compile the obtained desired multi-source sub-portions into the selected desired template output format into a composite work,
      wherein the desired multi-source sub-portions of the composite work are ordered per the obtained order,
      wherein the ads are included in the composite work,
      wherein the ads are obtained from advertisers;
   means to provide the composite work to the requestor.

12. The system of claim 11, wherein apportionment for each sub-portion is assessed as having a fixed value, wherein apportionment for multi-source sub-portions is reduced by advertising.

13. The system of claim 11, wherein ads are included in the composite work and the inclusion of ads is based on a selection of a type of ad.

14. The system of claim 11, wherein the output format selections include any of: electronic delivery and physical delivery including print outs.

15. The system of claim 14, wherein the print outs may be in a modular book format.

16. A non-transitory computer-readable medium storing processor-executable instructions for generating a composite work, the instructions comprising:
   providing types of content works for display,
      wherein the types of content works are provided such that they are selectable, wherein the types of content works are read from a database,
      wherein the types of content works include any of: audio works, video works, books, periodicals, and information service providers
      wherein the books may include any of academic texts, reference books, travel books, self-help books,
      wherein the periodicals may include any of magazines, newspapers, and
   displaying the types of content works;
   obtaining a selection from a requestor for a desired type of content work;
   obtaining a selector for the selection of the desired type of content work, wherein the selector allows a requestor to provide user selections for desired content works;
   obtaining user selections for desired content works, wherein the obtained user selections for desired content works was obtained via the selector;
   effecting identification of content works matching the user selections for desired works;
   obtaining content works and associated multi-source sub-portions matching the user selections for desired works;
   displaying the matching associated multi-source sub-portions for each displayed content work, wherein the displaying allows a requestor to provide user selections for desired multi-source sub-portions;
   obtaining user selections for desired multi-source sub-portions;
   obtaining user selections for an order for the desired multi-source sub-portions;
   displaying template options for a composite output format;
   obtaining a selection for a desired template for a composite output format;
   obtaining a selection of ads to be included in a composite work;
   determining apportionment for the desired multi-source sub-portions, wherein each multi-source sub-portion is assessed as having a pro-rata value based on its percentage of a whole work, wherein apportionment is reduced by advertising;

obtaining payment information for a composite work, wherein a requestor will be charged based on output format selections and determined apportionment charges, wherein what is charged is reduced by advertising;

obtaining the desired multi-source sub-portions;

compiling the obtained desired multi-source sub-portions into the selected desired template output format into a composite work,
- wherein the desired multi-source sub-portions of the composite work are ordered per the obtained order,
- wherein the ads are included in the composite work,
- wherein the ads are obtained from advertisers;

providing the composite work to the requestor.

17. The medium of claim 16, wherein apportionment for each sub-portion is assessed as having a fixed value, wherein apportionment for multi-source sub-portions is reduced by advertising.

18. The medium of claim 16, wherein ads are included in the composite work and the inclusion of ads is based on a selection of a type of ad.

19. The medium of claim 16, wherein the output format selections include any of: electronic delivery and physical delivery including print outs.

20. The medium of claim 19, wherein the print outs may be in a modular book format.

* * * * *